(12) United States Patent
Zhang et al.

(10) Patent No.: US 9,206,767 B2
(45) Date of Patent: Dec. 8, 2015

(54) PLATE-FIN STRUCTURE EXHAUST GAS RECIRCULATION COOLER WITH HEAT-INSULATION FUNCTION

(75) Inventors: Wenfeng Zhang, Tiantai County (CN); Baijun Guan, Tiantai County (CN); Hao Liu, Tiantai County (CN); Yihong Hu, Tiantai County (CN); Xiaojun Qin, Tiantai County (CN); Youqi Zhao, Tiantai County (CN); Lianmin Yang, Tiantai County (CN); Shoudu Zhang, Tiantai County (CN); Kaijun Xu, Tiantai County (CN); Qingsong Lu, Tiantai County (CN); Luying Chen, Tiantai County (CN)

(73) Assignee: ZHEJIANG YINLUN MACHINERY CO., LTD., Tiantai, Zhejiang Province (CN)

( * ) Notice: Subject to any disclaimer, the term of this patent is extended or adjusted under 35 U.S.C. 154(b) by 191 days.

(21) Appl. No.: 14/110,872
(22) PCT Filed: Sep. 12, 2012
(86) PCT No.: PCT/CN2012/081278
§ 371 (c)(1),
(2), (4) Date: Oct. 9, 2013
(87) PCT Pub. No.: WO2013/139113
PCT Pub. Date: Sep. 26, 2013

(65) Prior Publication Data
US 2014/0034028 A1 Feb. 6, 2014

(30) Foreign Application Priority Data
Mar. 21, 2012 (CN) .......................... 2012 1 0076592

(51) Int. Cl.
*F02M 25/07* (2006.01)
*F28F 9/02* (2006.01)
(Continued)

(52) U.S. Cl.
CPC ........... *F02M 25/07* (2013.01); *F02M 25/0737* (2013.01); *F28D 7/1684* (2013.01);
(Continued)

(58) Field of Classification Search
CPC .............. F02M 25/07; F02M 25/0726; F02M 25/0731; F02M 25/0734; F02M 25/0737; F28F 9/02; F28F 9/0239; F28F 9/0241; F28F 9/0248; F28F 1/08; F28F 2265/26; Y02T 10/121; F28D 7/1684; F28D 21/0003
USPC ..................................................... 123/568.12
See application file for complete search history.

(56) References Cited

U.S. PATENT DOCUMENTS 6,390,186 B1 * 5/2002 Laudic et al. .................. 165/158
2003/0047171 A1 * 3/2003 Vaughan et al. ......... 123/568.12
(Continued)

FOREIGN PATENT DOCUMENTS

CN 2881504 Y 3/2007
CN 202023658 U 11/2011
(Continued)

*Primary Examiner* — Hung Q Nguyen
(74) *Attorney, Agent, or Firm* — Jiwen Chen

(57) ABSTRACT

The present invention discloses a plate-fin structure EGR cooler with heat-insulation function includes shell. The two ends of the shell are equipped with an air inlet flange and a discharge chamber. A water inlet pipe and a water outlet pipe are set on the shell near the air inlet flange and the discharge chamber. A cooling core assembly, an air chamber and a bellow are set in the shell. The main board at one end of the cooling core assembly is connected to the shell and the discharge chamber and the main board at another end is connected to one end of the air chamber. The other end of the air chamber is connected to one end of the bellow. The other end of the bellow is connected to the shell and the air inlet flange. A heat-insulating pipe connected to the air inlet flange is set within the bellow. Since the main board at the other side of the cooling core assembly is flexibly connected to the shell via the air chamber and the bellow, the axial deformation generated in the flat pipe unit can be transferred to and absorbed by the bellow through the air chamber and thus the axial heat stress generated from the heat deformation of the flat pipe unit is eliminated.

8 Claims, 8 Drawing Sheets

(51) Int. Cl.
*F28F 9/20* (2006.01)
*F28D 7/16* (2006.01)
*F28D 21/00* (2006.01)
*F28F 1/08* (2006.01)

(52) U.S. Cl.
CPC .............. *F28D21/0003* (2013.01); *F28F 1/08* (2013.01); *F28F 9/02* (2013.01); *F28F 9/0239* (2013.01); *F28F 9/0241* (2013.01); *F28F 9/0248* (2013.01); *F28F 9/20* (2013.01); *F28F 2265/26* (2013.01); *Y02T 10/121* (2013.01)

(56) References Cited

U.S. PATENT DOCUMENTS

2010/0083646 A1* 4/2010 Poppe .............................. 60/311
2011/0308778 A1* 12/2011 Tsuda et al. .................. 165/157

FOREIGN PATENT DOCUMENTS

| EP | 2148074 A2 | 1/2010 |
| JP | 2000291455 A | 10/2000 |

* cited by examiner

PLATE-FIN STRUCTURE EXHAUST GAS RECIRCULATION COOLER WITH HEAT-INSULATION FUNCTION

This is a U.S. national stage application of PCT Application No. PCT/CN2012/081278 under 35 U.S.C. 371, filed Sep. 12, 2012 in Chinese, claiming the priority benefit of Chinese Application No. 201210076592.6, filed Mar. 21, 2012, which is hereby incorporated by reference.

FIELD OF THE INVENTION

The present invention relates to engine exhaust gas cooling technology, especially a plate-fin structure exhaust gas recirculation (EGR) cooler for diesel engines. More specifically, it is a plate-fin structure EGR cooler with heat-insulation function that can be widely used in diesel engines of various types of automobiles.

BACKGROUND OF THE INVENTION

With the increasingly strict regulations on emission, exhaust gas recirculation technology has been applied in power unit more widely and the EGR coolers of various structures have been invented in succession. Among them, the plate-fin EGR cooler has gained more popularity due to its excellent heat dissipation performance.

The increasingly strict regulations on emission drive the improvement of the EGR rate, namely, the exhaust gas flow needed to be cooled by the EGR cooler is on the increase. Besides, many EGRs are set before the turbo, making them high-pressure EGRs which results in the exhaust gas temperature entering the EGR cooler reaching 700° C.-800° C.

A regular plate-fin EGR cooler is an exhaust gas recirculation cooler and its turbulent cooling fins disclosed by Chinese patent CN2009201173214. As shown in FIGS. 11, 12 and 13, the EGR cooler includes an air inlet pipe 1', an inlet chamber 2', a core assembly 5', a discharge chamber 6' and an air outlet pipe 7' which are connected in sequence. The core assembly 5 includes a turbulent cooling fin 11', a flat cooling pipe 10', a connecting main board 9', a shell 4', a water inlet pipe 3' and a water outlet pipe 8'. Multiple flat cooling pipes 10' are mounted by layers in the shell 4' with two ends of them plugged and fixed in holes on the main board 9' and connected to the inlet chamber 2' and the discharge chamber 6'. The turbulent cooling fins 11' are equipped in each flat cooling pipe 10'. The two connecting main boards 9' are respectively fixed at the two ends of the shell 4'. The water inlet pipe 3' and the water outlet pipe 8' are equipped on the shell 4'.

The gas channel of the EGR cooler is composed of several flat pipe units. A single flat pipe unit is consisted of a flat pipe 10' and its built-in heat transfer fin 11'. Each flat pipe unit is welded to the corresponding hole of the main boards 9' to make a core assembly. The two main boards 9' of the core assembly are welded with the shell 4', the inlet chamber 2' and the discharge chamber 6'. The water inlet pipe 3' and the water outlet pipe 8' are welded to the shell 4' to form the EGR cooler assembly. Thus, the exhaust gas is flowing at the inner chamber of the flat pipe unit and the cooling water is flowing at the external side of the flat pipe unit and the internal cavity of the shell 4', absorbing heat of the exhaust gas and taking the heat away.

The regular plate-fin structure EGR cooler has the following disadvantages: 1. when the EGR cooler is in operation, the high-temperature exhaust gas impact the main board of the EGR cooler and the main board will expand to generate stress; 2. during the operation of the EGR, the different expansion and contraction of the shell and the flat pipe unit result in axial stress. The stress generated due the above two points can easily lead to the cracking of the welded joint at the ends of the main board and the flat pipe unit.

SUMMARY OF THE INVENTION

The present invention is to solve the above problems in the prior art and to provide an EGR cooler with improved heat dissipation effect and higher reliability.

To solve the problems, the present invention adopts the following technologies: a plate-fin structure EGR cooler with heat-insulation function comprises a shell, the two ends of which are equipped with an air inlet flange and a discharge chamber; a water inlet pipe and a water outlet pipe are installed on the shell near the air inlet flange and discharge chamber; a cooling core assembly, an air chamber and a bellow are installed within the shell; the cooling core assembly comprises two main boards at its two ends, flat pipe units and water-side fins placed alternately, each flat pipe unit is composed of a flat pipe and a built-in heat transfer fin, characterized in that the main board at one end of the cooling core assembly is connected to the shell and the discharge chamber and the main board at another end is connected to one end of the air chamber; the other end of the air chamber is connected to one end of the bellow, the other end of which is connected to the shell and the air inlet flange; a heat-insulating pipe connected to the air inlet flange is installed within the bellow.

The plate-fin EGR cooler with heat-insulating function of the present invent, the air inlet flange, the internal side of the heat-insulating pipe, the air chamber, the internal side of the flat pipe and the discharge chamber form an air side channel. The water inlet pipe, the water outlet pipe, the external side of the bellow, the external side of the air chamber, the water-side fin and the internal cavity of the shell form a water-side channel. Exhaust gas emitted by engine flows through the air side channel to exchange heat with the cooling water flowing through the water-side channel in the cooling core assembly. The heat is absorbed and taken away by the cooling water and thus the cooling effect is achieved.

The plate-fin structure EGR cooler with heat-insulating function of the present invent, the main board at one side of the cooling core assembly is directly connected to the shell and the one at the other side is flexibly connected to the shell via the air chamber and the bellow. Since it is not directly and rigidly connected, the axial deformation generated in the flat pipe unit can be transferred to and absorbed by the bellow through the air chamber with the movement of the main board at the other side in the shell and thus the axial heat stress generated from the heat deformation of the flat pipe unit is eliminated.

As a further improvement according to the present invention, a heat-insulating board is installed on the end of the main board of the other side. Holes are set on the heat-insulating board to connect the flat pipes. The existence of the heat-insulating board prevents the direct impact of high-temperature exhaust gas on the main board. Therefore, the surface temperature of the main board will be significantly reduced, which means the stress generated from the heat expansion is significantly reduced. Heat and corrosion-resistance materials are used for the heat-insulating board. One end of the heat-insulating board is welded to the main board and the other side is unfixed. Therefore, the heat deformation generated from the heat expansion of the heat-insulating board can be easily relieved.

As another improvement according to the present invention, the shell facing the main board of the other side is protruded to form two water channels at the downstream of which a pair of flow-resistance board are installed. The structure has obviously improved the water flow, allowing sufficient water to cool the main board and the welded joint of the flat pipe unit and the main board, furthering reducing the temperature of the inlet side main board and decreasing the heat stress of the main board and the flat pipe unit.

A still further improvement according to the present invention is that one end of the heat-insulating pipe is fixedly connected to the bellow and the inlet flange and the other end is contacted to the bellow through the boss at an external surface. Based on this structure, the heat-insulating pipe, on the one hand, can effectively connect and position the bellow and, on the other hand, will not limit the axial movement of the bellow because the inward end of the heat-insulating pipe contacts but is not fixed to the bellow. When axial deformation is generated due to the heat on the flat pipe unit, the bellow can move freely in an axial direction and can transfer, absorb and eliminate the axial stress on the main board of the flat pipe unit. Bulge loop or flared opening structure can also be adopted for the contact of the free end of the heat-insulating pipe and the bellow to achieve the same effect.

Another further improvement according to the present invention is that sub-main boards are respectively installed at the internal sides of the main board at the two ends of the cooling core assembly. Several through holes are formed on the board plane of each sub-main board to pass the flat pipes. A flange vertical to the board plane is set at the periphery of each hole. Due to the right angle of the connection of the main board and the flat pipe, stress concentration can be easily formed at such connection after welding and cause weld cracking The newly added sub-main board can increase the weld length of the flat pipe through the holes and flanges connection parts of the flat pipe and sub-main board to disperse the stress of the weld and protect the flat pipe.

Still another improvement according to the present invention is that the internal side of the flow-resistance board is a rippled structure matching the external shape of the flat pipe of the cooling core assembly to maintain the smooth water flow of this part.

A still further improvement according to the present invention is that several square bosses are installed on the shell to increase the strength of the shell.

BRIEF DESCRIPTION OF THE DRAWINGS

A further explanation to the present invention is given below by combining the figures and embodiments.

Figure 1:
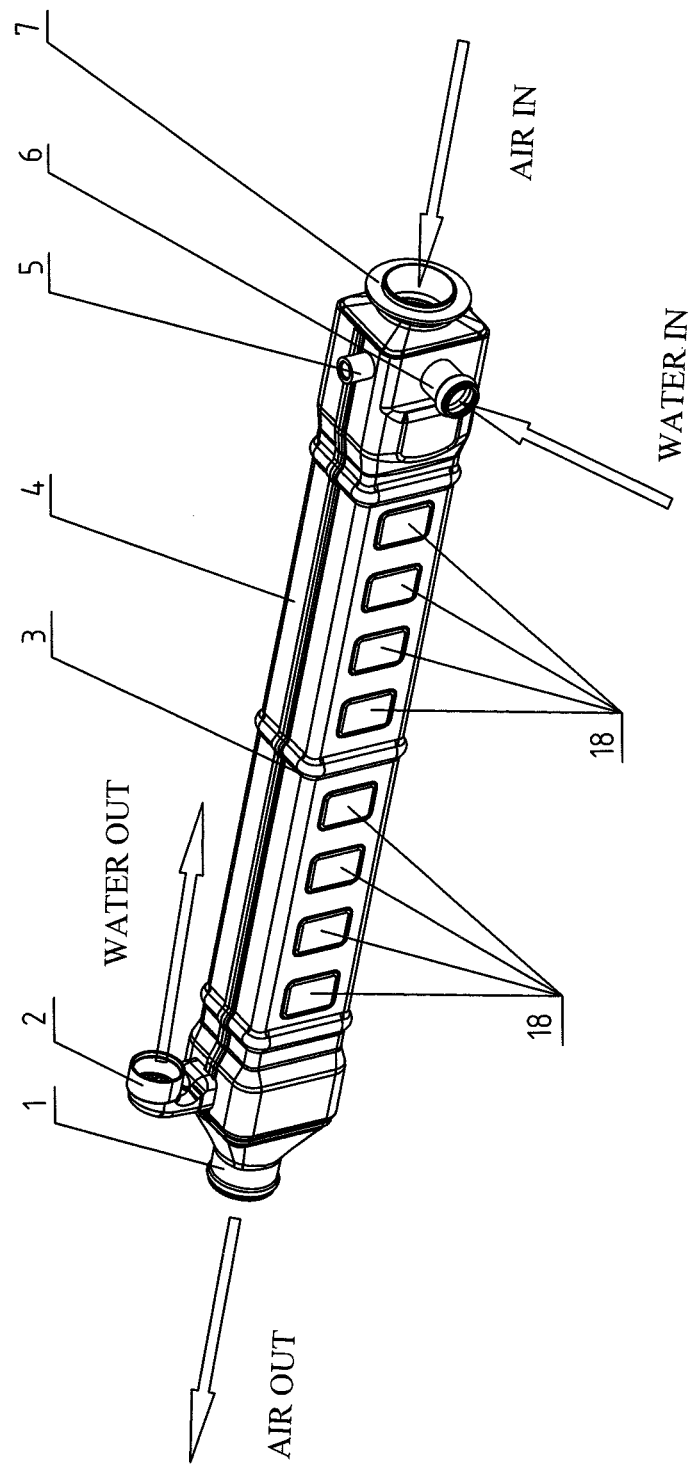
FIG. 1 is the three-dimensional drawing of the plate-fin structure EGR cooler with heat-insulation function according to the present invention.
Figure 2:
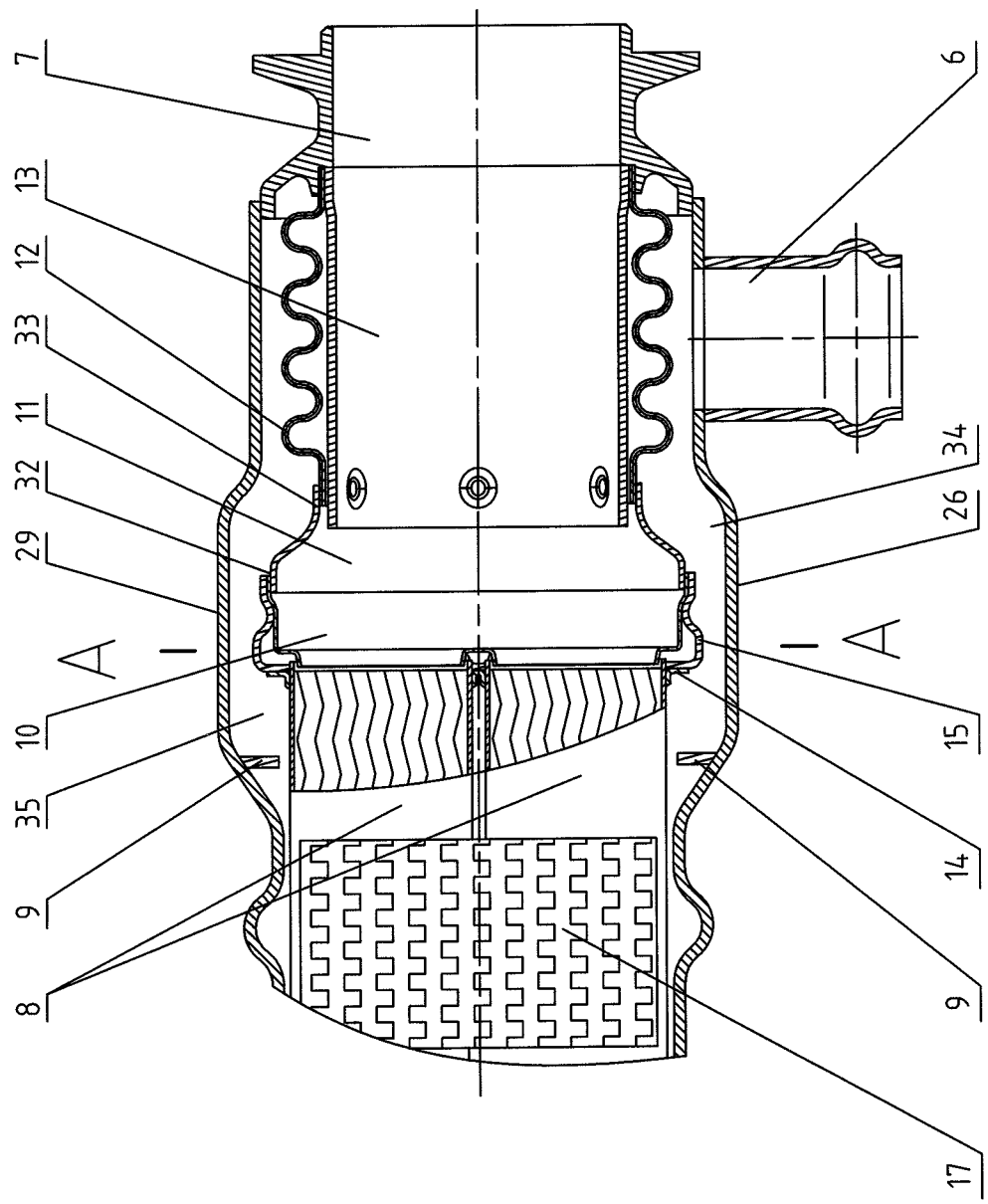
FIG. 2 shows the air inlet structure according to the present invention.
Figure 3:
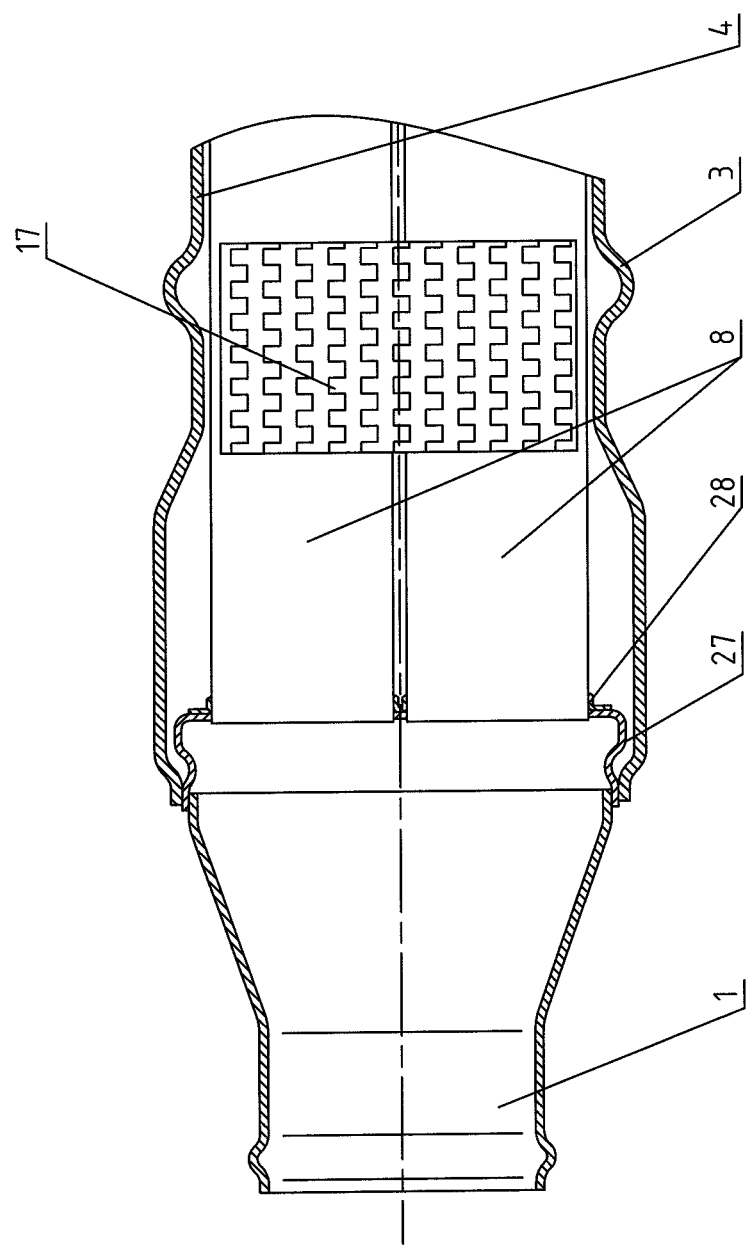
FIG. 3 shows the air outlet structure according to the present invention.
Figure 4:
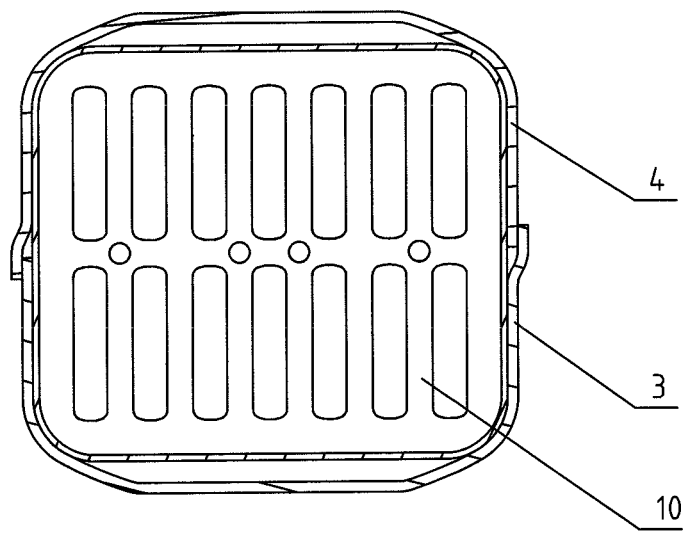
FIG. 4 is the A-A cutaway view of FIG. 2.
Figure 5:
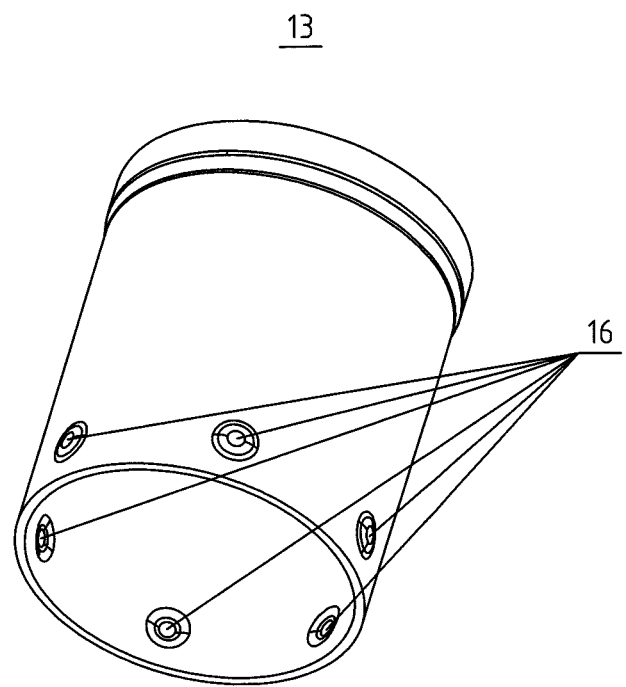
FIG. 5 shows the heat-insulating pipe structure.

In the figures: 1—discharge chamber; 2—water outlet pipe; 3—shell; 4—shell; 5—vent tube; 6—water inlet pipe; 7—air inlet flange; 8—flat pipe unit; 9—flow—resistance board; 10—heat-insulating board; 11—air chamber; 12—bellow; 13—heat-insulating pipe; 14—sub-main board; 15—main board; 16—boss; 17—water-side fin; 18—square boss; 19—water flow channel; 20—air flow channel; 22—through hole on the heat-insulating board; 23—through hole on the main board;

24—through hole on the sub-main board; 25—internal side of the flow-resistance board; 26—bulge on the shell 3; 27—main board; 28—sub-main board; 29—bulge on the shell 4; 30—main board plate; 31—main board frame; 32—external wall of the air chamber; 33—internal wall of the air chamber; 34—water flow channel; 35—water flow channel; 36—plate of the sub-main board; 37—flange of the sub-main board; 38—external side of the flow-resistance board.

DETAILED DESCRIPTION OF A PREFERRED EMBODIMENT

As FIGS. 1-9 show, the plate-fin structure EGR cooler with heat-insulating function of the present invention comprises a front shell 3 and a back shell 4, two ends of which are equipped with an air inlet flange 7 and a discharging chamber 1. A water inlet and an outlet are equipped on the shell near the air inlet flange 7 and the discharging chamber 1. The water inlet and the water outlet are connected to a water inlet pipe 6 and an outlet pipe 2, respectively. A cooling core assembly, an air chamber 11 and a bellow 12 are installed within the shells 3,4.

Figure 6:
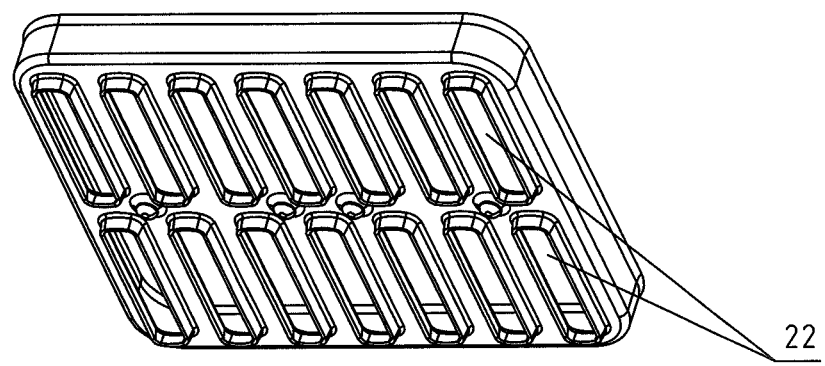
FIG. 6 shows the heat-insulating board structure.
Figure 7:
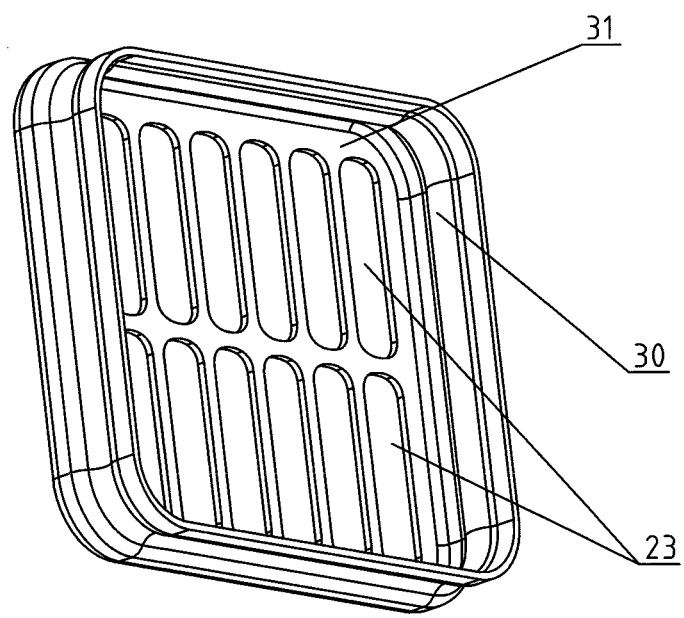
FIG. 7 shows the main board structure.
Figure 8:
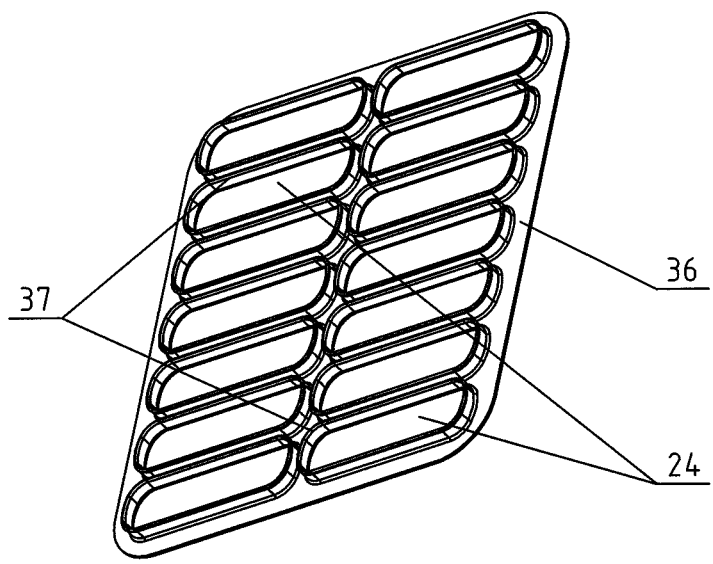
FIG. 8 shows the sub-main board structure.
Figure 9:
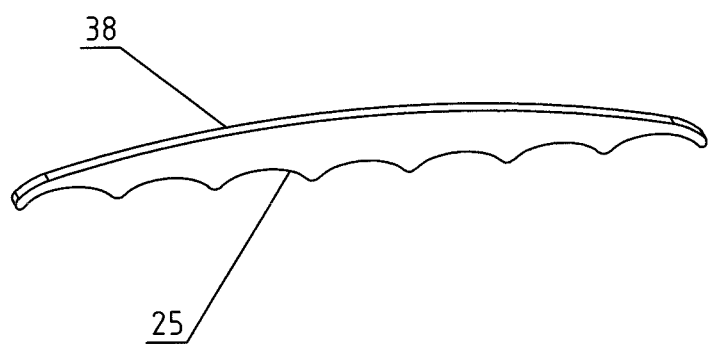
FIG. 9 shows the flow-resistance board structure.

The cooling core assembly comprises main boards 15 and 27 at its two ends, sub-main boards 14 and 28 at the internal sides of the main board, and upper and lower groups of flat pipe units 8. Each flat pipes unit 8 includes a flat pipe and a heat transfer fin installed therein. The flat pipe units 8 of upper and lower group are set in pair and a water-side fin 17 is set between each two pair of units 8. As FIG. 6 shows, several through holes 24 are set on the board 36 of each sub-main boards 14 and 28 for the flat pipes to pass. Bosses 37 are placed surrounding the holes 24 and vertical to the board plane 36. As FIG. 7 shows, the main boards 15 and 27 include the board 30 in the middle and the frame 31 at the surroundings of the main boards. Through holes 23 are set on the board 30. The flat pipe unit 8 is inserted into the hole 23 on the main board after passing the flange 37 and the hole 24 on the sub-main board and together they are welded to form a cooling core assembly.

The frame 31 of the main board 27 at the left end of the cooling core assembly is welded to the shells 3,4 and discharging chamber 1, and the frame 31 of the right end main board 15 is welded to the external wall 32 on the left side of the air chamber 11, the internal wall 33 of the right side of the discharge chamber 11 is welded to the external wall at the left end of the bellow 12. The right end of the bellow 12 is welded to the shells 3, 4 and air inlet flange 7. A heat-insulating pipe 13 is set in the bellow 12 to connect the air inlet flange 7. The right end of the heat-insulating pipe 13 is welded to the right end of the bellow 12, and its left end contacts the internal wall of the bellow 12 through the external surface boss 16.

A heat-insulating board 10 is set on the external side of the board 30 of the left main board 15. It is placed within the main board frame 31, on which holes 22 are set to connect the flat pipes. The left end of the heat-insulating board 10 is welded to the board 30 of the left main board 15 and the external wall 32 of the air chamber 11. The other end is free. Thus, the heat deformation of the heat-insulating board 10 caused by heat expansion can be freely released.

Places 26 and 29 of the shell 3 and 4 facing the right main board 15 protrude to form two water channels 34 and 35. Two flow-resistance boards 9 are set at the downstream of the water channels. The external side 38 of the flow-resistance board 9 is in an arc shape and connected to the internal side of the shells 3 and 4. The internal side 25 of the flow-resistance board 9 is in a rippled structure matching the flat pipe shape of the cooling core assembly to maintain the smooth water flow thereof. The flow-resistance board 9 has significantly improved the water flow, allowing sufficient water to cool the main board 15 and the welded joint of the flat pipe unit 8 and the main board 15, furthering reducing the temperature of the inlet side main board 15 and decreasing the heat stress of the main board 15 and the flat pipe unit 8.

Figure 10:
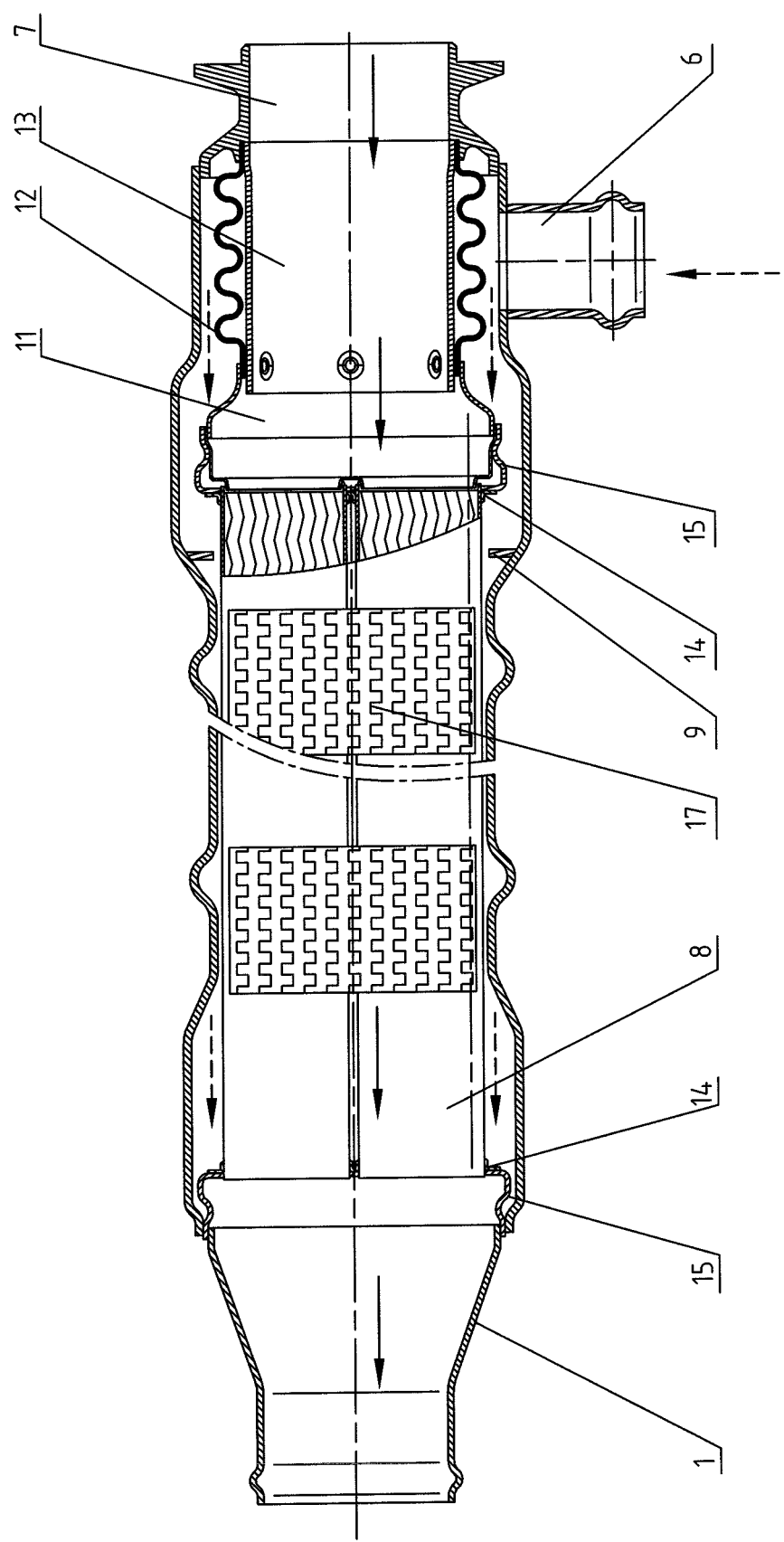
FIG. 10 shows the air-side and water-side medium flow according to the present invention.
Figure 11:
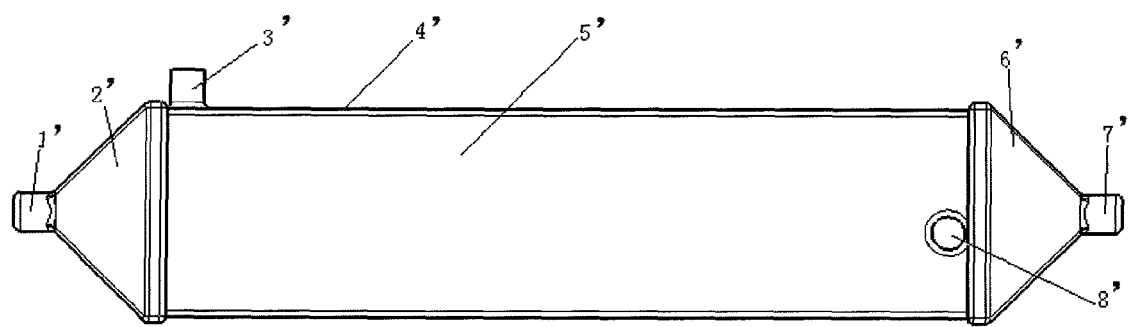
FIG. 11 shows the existing EGR cooler assembly structure.
Figure 12:
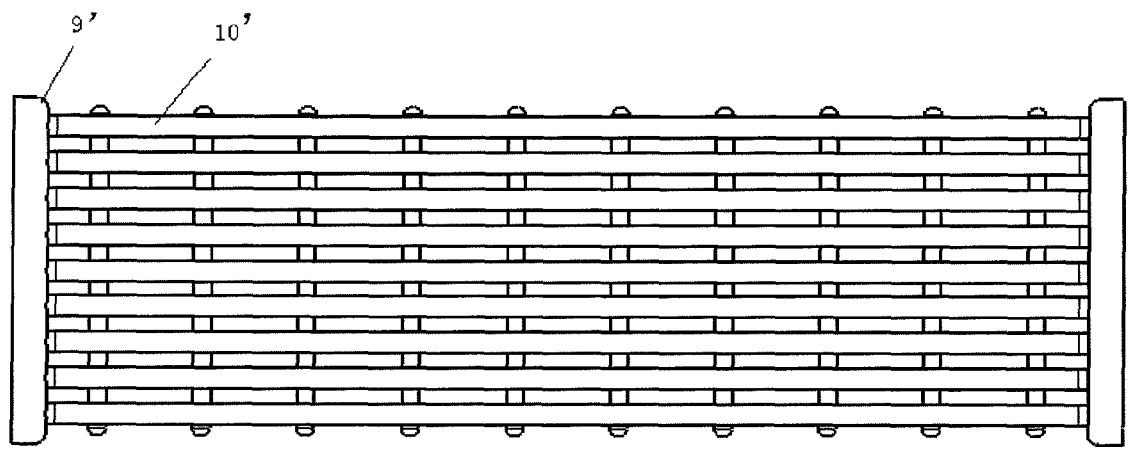
FIG. 12 shows the existing EGR cooler core assembly structure.
Figure 13:
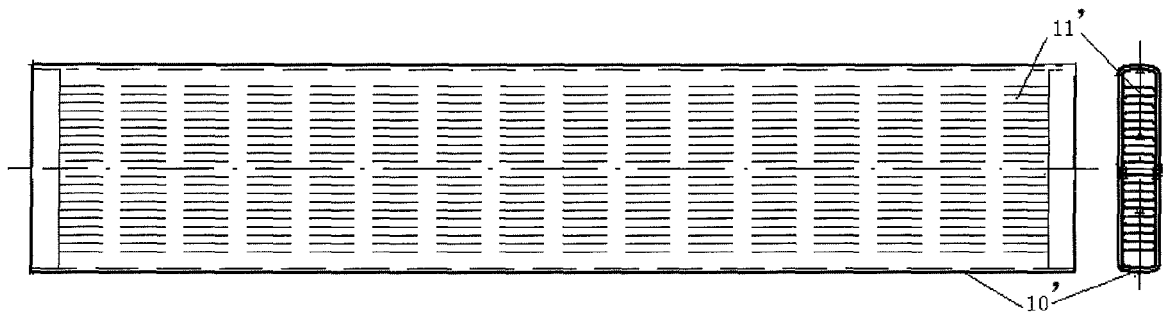
FIG. 13 shows the existing EGR cooling flat pipe unit structure.

As FIG. 10 shows, operation path of the air-side of the plate-fin structure EGR cooler of the present invention is as follows: Exhaust gas emitted by the engine flows through the air inlet flange 7 to the internal side of the heat-insulating pipe 13, passes the air chamber 11 and the holes 22 on the heat-insulating board 10 to enter the internal side of the flat pipe of the cooling core assembly. At such position, heat exchange with the cooling water in the area of water-side fins 17 occurs. The heat is absorbed and taken away by the cooling water and thus the cooling effect is achieved; the cooled exhaust gas is discharged through the discharging chamber (as the solid arrow shows).

The operation path of the water-side of the present invention is shown as follows: cooling water passes through the water inlet pipe to enter the cavity of the shell 3 and 4, flows through the external side of the bellow 12, external side of the air chamber 11 and the water channels 34 and 35 at the external side of the main board 15, and is blocked by the flow-resistance board 9 and then bypasses the flow-resistance board 9 to enter the water-side fin 17 area between the flat pipes of the cooling core assembly where heat exchange with the high-temperature exhaust gas of the internal side of the flat pipes occurs, and the heat is absorbed and taken away; the warmed cooling water is discharged through the water outlet pipe (as the dotted arrow shows)

It should be understood that the present invention is not limited by the embodiments described above which are presented as an explanation only but can be modified in various ways within the spirit and scope of protection defined by the present invention.

The invention claimed is:

1. A plate-fin structure exhaust gas recirculation (EGR) cooler with heat-insulation function, comprising shells, two ends of which are equipped with an air inlet flange and a discharge chamber; a water inlet pipe and a water outlet pipe are set on the shells near the air inlet flange and the discharge chamber; a cooling core assembly, an air chamber and a bellow are set in the shells; the cooling core assembly comprises two main boards at its two ends and flat pipe units and water-side fins that are placed alternately, each flat pipe unit is composed of a flat pipe and a heat transfer fin built therein, characterized in that the main board at one end of the cooling core assembly is connected to the shells and the discharge chamber and the main board at another end is connected to one end of the air chamber; the other end of the air chamber is connected to one end of the bellow; the other end of the bellow is connected to the shells and the air inlet flange; a heat-insulating pipe connected to the air inlet flange is set within the bellow.

2. The plate-fin structure EGR cooler with heat-insulation function according to claim 1, wherein a heat-insulating board is set on the end of the main board of the other side, through holes are set on the heat-insulating board to connect the flat pipes.

3. The plate-fin structure EGR cooler with heat-insulation function according to claim 2, wherein one end of the heat-insulating board is welded to the main board and the other side is unfixed.

4. The plate-fin structure EGR cooler with heat-insulation function according to claim 1, wherein places on the shells facing the main board are protruded to form two water channels and a pair of flow-resistance boards are set at the downstream of the two water channels.

5. The plate-fin structure EGR cooler with heat-insulation function according to claim 1, wherein one end of the heat-insulating pipe is fixedly connected to the bellow and the inlet flange and the other end is contacted to the bellow through a boss at an external surface of the other end.

6. The plate-fin structure EGR cooler with heat-insulation function according to claim 1, wherein sub-main boards are placed respectively at the internal sides of the main boards at the two ends of the cooling core assembly, a board plane of the each sub-main boards comprises a plurality of through holes for passing the flat pipes, a flange vertical to the board plane is set at the surroundings of each hole.

7. The plate-fin structure EGR cooler with heat-insulation function according to claim 1, wherein an internal side of a flow-resistance board is rippled structure.

8. The plate-fin structure EGR cooler with heat-insulation function according to claim 1, wherein a plurality of square bosses are set on the shells.

* * * * *